(12) United States Patent
Maekawa et al.

(10) Patent No.: US 6,433,044 B1
(45) Date of Patent: Aug. 13, 2002

(54) METHYL METHACRYLATE RESIN COMPOSITION AND MOLDED ARTICLE THEREOF

(75) Inventors: Tomohiro Maekawa; Kenji Manabe, both of Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/910,900

(22) Filed: Jul. 24, 2001

(30) Foreign Application Priority Data

Jul. 27, 2000 (JP) ........................................ 2000-226679
Mar. 12, 2001 (JP) ........................................ 2001-068341

(51) Int. Cl.[7] ................................................. C08K 5/34
(52) U.S. Cl. ............................ 524/99; 428/1.1; 524/87; 524/236; 524/239; 524/533; 524/95; 524/102; 525/304
(58) Field of Search ........................... 524/533, 87, 95, 524/99, 102, 236, 239; 525/304; 428/1.1

(56) References Cited

U.S. PATENT DOCUMENTS 4,755,620 A * 7/1988 Iwamoto et al. ............ 560/224
6,262,153 B1 * 7/2001 Webster et al. ............... 524/99

OTHER PUBLICATIONS

J.E. Pickett et al., "Photodegradation of UV screeners", Polymer Degradation and Stability 42, (1993), pp. 231–244.
J.E. Pickett et al., "Photostability of UV Screeners in Polymers and Coatings", Advances in Chemistry Series 249, (1996), pp. 287–301.

* cited by examiner

Primary Examiner—Judy M. Reddick
(74) Attorney, Agent, or Firm—Sughrue Mion, PLLC

(57) ABSTRACT

The present invention provides a methyl methacrylate resin composition exhibiting superior durability without impairing the transparency inherent to a methyl methacrylate resin, which comprises a methyl methacrylate resin and a 2-(1-arylalkylidene)malonic acid ester in an amount of 0.0005 to 0.1 parts by weight per 100 parts by weight of the methyl methacrylate resin.

11 Claims, No Drawings

METHYL METHACRYLATE RESIN COMPOSITION AND MOLDED ARTICLE THEREOF

BACKGROUND OF THE INVENTION

1. Field of the Invention

The present invention relates to a methyl methacrylate resin composition and a molded article thereof. More specifically, it relates to a methyl methacrylate resin composition containing an ultraviolet absorber, and a molded article thereof.

2. Description of the Related Art

As a conventional method to improve the durability of a methyl methacrylate resin composition, a method including addition of an ultraviolet absorber to the composition is known. For instance, JETI, vol.46, No. 5, p.116–121 (1998) discloses use of a salicylate, cyano acrylate or benzotriazole compound as an ultraviolet absorber to be added to methyl methacrylate resins.

In the case where a methyl methacrylate resin blended with ultraviolet absorbers conventionally used is molded into an optical article, however, light transmitted through the optical article may be somewhat colored presumably due to the power absorbing viewable light of the ultraviolet absorbers used, hence, the transparency of the molded optical article may be insufficient. This problem becomes noticeable particularly when a transmitted optical path length of the molded optical article is long.

SUMMARY OF THE INVENTION

An object of the present invention is to provide a methyl methacrylate resin composition exhibiting superior durability without impairing the transparency inherent to a methyl methacrylate resin.

The present inventors made intensive have studied a methyl methacrylate resin composition exhibiting superior durability without impairing the transparency inherent to a methyl methacrylate resin, as a result, found that a methyl methacrylate resin composition containing a 2-(1-arylalkylidene)malonic acid ester exhibits superior durability without impairing the transparency inherent to a methyl methacrylate resin, and have completed the present invention.

That is, the present invention provides a methyl methacrylate resin composition comprising a methyl methacrylate resin and a 2-(1-arylalkylidene)malonic acid ester in an amount of about 0.0005 to about 0.1 parts by weight per 100 parts by weight of the methyl methacrylate resin.

DETAILED DESCRIPTION OF THE PREFERRED EMBODIMENTS

The present invention will hereinafter be described in detail.

In the present invention, the methyl methacrylate resin is a polymer comprising not less than about 50% by weight of methyl methacrylate as a monomer forming the resin. An example of such a polymer is a polymer comprising not less than about 50% by weight of poly methyl methacrylate, which is essentially a monopolymer of methyl methacryate, or a copolymer comprising methyl methacrylate and not more than about 50% by weight of an unsaturated monomer, which is copolymerizable therewith.

Examples of unsaturated monomers which are copolymerizable with methyl methacrylate include methacrylic acid esters such as ethyl methacrylate, butyl methacrylate, cyclohexyl methacrylate, phenyl methacrylate, benzyl methacrylate, 2-ethylhexyl methacrylate, and 2-hydroxyethyl methacrylate; acrylic acid esters such as methyl acrylate, ethyl acrylate, butyl acrylate, cyclohexyl acrylate, phenyl acrylate, benzyl acrylate, 2-ethylhexyl acrylate, and 2-hydroxyethyl acrylate; unsaturated acids such as methacrylic acid and acrylic acid; styrene, α-methylstyrene, acrylonitrile, methacrylonitrile, maleic acid anhydride, phenylmaleimide, and cyclohexylmaleimide. Two or more of these unsaturated monomers may be used in combination if necessary. The aforementioned copolymer may contain a glutaric acid anhydride unit or a glutarimide unit.

In terms of moldability, alkyl acrylates such as methyl acrylate are preferred as the unsaturated monomer, which is copolymerizable with methyl methacrylate. When such an alkyl acrylate is contained as the unsaturated monomer, the composition of the monomers used in the copolymer preferably comprises about 80 to about 99.5% by weight of methyl methacrylate and about 0.5 to about 20% by weight of the alkyl acrylate.

In terms of its lower water absorption property, styrene is preferred as the unsaturated monomer, which is copolymerizable with methyl methacrylate. When styrene is contained as the unsaturated monomer, the composition of the monomers used in the copolymer preferably comprises about 60 to about 90% by weight of methyl methacrylate and about 10 to about 40% by weight of styrene.

According to the present invention, a 2-(1-arylalkylidene) malonic acid ester is contained in the methyl methacrylate resin to provide a methyl methacrylate resin composition having superior transparency and durability. In terms of durability, an amount of the 2-(1-arylalkylidene)malonic acid ester is not less than about 0.0005 parts by weight, preferably not less than about 0.003 parts by weight, more preferably not less than about 0.005 parts by weight, per 100 parts by weight of the methyl methacrylate resin. In terms of transparency, the content of the 2-(1-arylalkylidene)malonic acid ester is not more than about 1 part by weight, preferably not more than about 0.05 parts by weight, more preferably not more than about 0.03 parts by weight, per 100 parts by weight of the methyl methacrylate resin.

Among 2-(1-arylalkylidene)malonic acid esters, those represented by the following general formula (1) are preferred in terms of durability;

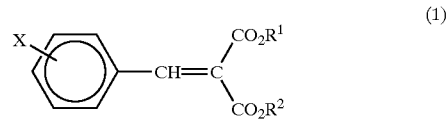

(1)

wherein X represents a hydrogen atom, an alkyl group having 1 to about 6 carbon atoms or an alkoxy group having 1 to about 6 carbon atoms, and $R^1$ and $R^2$ independently represent an alkyl group having 1 to about 6 carbon atoms.

In the formula (1), X is preferably a hydrogen atom, an alkyl group having 1 to about 4 carbon atoms or an alkoxy group having 1 to about 4 carbon atoms. The alkyl group represented by X or the alkyl group in the alkoxy group represented by X may be either in a straight-chain form or in a branched-chain form. Examples of such alkyl groups include a methyl group, ethyl group, n-propyl group, i-propyl group, n-butyl group, i-butyl group, s-butyl group, and t-butyl group. More preferably, X is a methoxy group.

Preferably, $R^1$ and $R^2$ in the formula (1) are each an alkyl group having 1 to about 4 carbon atoms. The alkyl group represented by $R^1$ or $R^2$ may be either in a straight-chain form or in a branched-chain form. Examples of such alkyl groups include a methyl group, ethyl group, n-propyl group, i-propyl group, n-butyl group, i-butyl group, s-butyl group, and t-butyl group. More preferably, $R^1$ and $R^2$ are each a methyl group.

The composition of the present invention may contain a hindered amine such as a compound having a 2,2,6,6-tetraalkylpiperidine skeleton for further improved durability. In this case, the content of such a hindered amine is usually not less than about 0.0001 parts by weight, preferably not less than about 0.001 parts by weight, more preferably not less than about 0.003 parts by weight, per 100 parts by weight of the methyl methacrylate resin. In terms of cost and transparency, an amount of the hindered amine is usually not more than about 0.1 parts by weight, preferably not more than about 0.05 parts by weight, more preferably not more than about 0.03 parts by weight. The content of the hindered amine per 100 parts by weight of the 2-(1-arylalkylidene) malonic acid ester is usually not more than about 100 parts by weight, preferably in the range of about 10 to about 80 parts by weight.

Examples of such hindered amines include a polycondensate of dimethyl succinate and 1-(2-hydroxyethyl)-4-hydroxy-2,2,6,6-tetramethylpiperidine, poly((6-(1,1,3,3-tetramethylbutyl)imino-1,3,5-triazine-2,4-diyl)((2,2,6,6-tetramethyl-4-piperidyl)imino))hexamethylene((2,2,6,6-tetramethyl-4-piperidyl)imino, 2-(2,3-di-t-butyl-4-hydroxybenzyl)-2-n-bis(1,2,2,6,6-pentamethyl-4-piperidyl) butylmalonic acid, 2-(3,5-di-t-butyl-4-hydroxybenzyl)-2-n-bis(1,2,2,6,6-pentamethyl-4-piperidyl)butylmalonic acid, a condensate of N,N'-bis(3-aminopropyl)ethylenediamine and 2,4-bis(N-butyl-N-(1,2,2,6,6-pentamethyl-4-piperidyl) amino)-6-chloro-1,3,5-triazine, bis(2,2,6,6-tetramethyl-4-piperidyl)sebacate, bis(2,2,6,6-tetramethyl-4-piperidyl) succinate, and compounds represented by the following general formula (2);

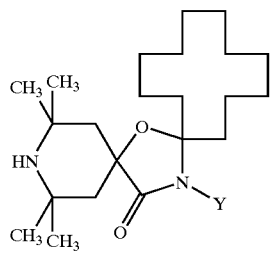

(2)

wherein Y represents a hydrogen, atom, an alkyl group having 1 to about 20 carbon atoms, a carboxyalkyl group having 2 to about 20 carbon atoms, an alkoxyalkyl group having 2 to about 25 carbon atoms, or an alkoxycarbonylalkyl group having 3 to about 25 carbon atoms. Two or more of these hindered amines may be used in combination if necessary. Among them, the compounds represented by the general formula (2) are preferable.

In the compounds of the above formula (2), each of the alkyl group, carboxyalkyl group, two alkyl groups in the alkoxyalkyl group (the alkyl group in the alkoxy group and the alkyl groups substituted with the alkoxy group), and two alkyl groups in the alkoxycarbonylalkyl group (the alkyl group in the alkoxy group and the alkyl groups substituted with the alkoxycarbonyl group) may be either in a straight-chain form or a branched-chain form. In the formula (2), Y is preferably a hydrogen atom or an alkoxycarbonylalkyl group having about 5 to about 24 carbon atoms. Particularly, a hydrogen atom or an alkoxycarbonylethyl group is more preferable as Y. Examples of such alkoxycarbonylethyl groups include dodecyloxycarbonylethyl group, tetradecyloxycarbonylethyl group, hexadecyloxycarbonylethyl group, and octadecyloxycarbonylethyl group.

The composition of the present invention may contain various additives if necessary. Examples of such additives include light diffusing agents or matting agents such as siloxane crosslinking resin particles, styrene crosslinking resin particles, acrylic crosslinking resin particles, glass particles, talc, calcium carbonate, and barium sulfate; antistatic agents such as sodium alkyl sulfonate, sodium alkylsulfate, stearic acid monoglyceride, and polyether esteramide; antioxidants such as hindered phenols; flame-retardants such as phosphoric acid esters; and lubricants. such as palmitic acid and stearyl alcohol. These additives may be used in combination of two or more of them.

As a method for preparing the composition of the present invention, there can be mentioned a method in which the methyl methacrylate resin, 2-(1-arylalkylidene)malonic acid ester, and, if necessary, a hindered amine or other additives are melt-kneaded with use of a single- or twin-screw extruder, or any one of various kneaders. Alternatively, it is possible to obtain the composition in a pellet form, a plate form or a like form by mixing a monomer forming the methyl methacrylate resin or a syrup containing a partial polymer of the monomer, the 2-(1-arylalkylidene)malonic acid ester, and, if necessary, a hindered amine or other additives together to allow bulk polymerization to proceed either batch-wise or continuously.

The composition of the present invention can be formed into various molded articles by molding processes such as extrusion molding, injection molding, and press molding. Examples of such molded articles include a signboard, a carport roof, an lighting cover, a front sheet for vending machines, a showcase, a toy, a lens, a prism, and a light guide. Among them, optical articles such as lens, prism, and light guide are preferable.

When the composition of the present invention is used for applications as optical articles in particular, a light transmittance of a molded article made from the composition with respect to light having a wavelength of 400 nm through a 30 cm-long optical path is usually not less than about 50%, preferably not less than about 70%. An average light transmittance of such a molded article with respect to light in the visible light range (the wavelength range of about 380 to about 780 nm) is usually not less than about 75%, preferably not less than about 80%.

The composition of the present invention can be suitably used for light guides, in particular, among optical articles. In recent years, a cold cathode fluorescent lamp exhibiting high efficiency and high luminance has been developed as a light source for a backlight of a liquid crystal display device, and with the development of such a cold cathode fluorescent lamp large-scale liquid display devices exhibiting increasing luminance are developed. Under such situations, light guides made from conventional methyl methacrylate resin compositions sometimes do not satisfy the requirement of transparency or durability. A light guide made from the composition of the present invention is excellent in both transparency and durability and hence can advantageously be used in a backlighting system incorporating a cold cathode fluorescent lamp having high luminance without causing deterioration of its own and of peripheral articles.

In molding the composition into a light guide, the composition may be molded into a sheet shape by extrusion molding using a T die or a roll unit, or may be molded into a sheet shape or a wedge shape by injection molding or press molding. Alternatively, the composition in a sheet shape may be prepared by cast polymerization.

A light guide made from the composition of the present invention is suitably used in the backlighting system of a liquid crystal display device with its screen having a width across corners measuring not less than about 14 inches, preferably not less than about 20 inches.

EXAMPLES

Hereinafter, the present invention will be more specifically described by way of examples, which should not be construed as limitative of the present invention.

The following compounds (A) to (F) were used as a compound added into a methyl methacrylate resin.

(A): 2-(paramethoxybenzylidene)dimethylmalonate[a compound of the formula (1) where X is a methoxy group, which is substituted at para-position, and $R^1$ and $R^2$ are each a methyl group; produced by Clariant Co. under the trade name: Sanduvor PR-25]

(B): 2-(2-hydroxy-5-methylphenyl)-2H-benzotriazole [produced by Sumitomo Chemical Co., Ltd. under the trade name: SUMISORB 200]

(C): 2,4-dihydroxybenzophenone [produced by Sipuro Kasei Co., Ltd. under the trade name: SEASORB 100]

(D): 2,2'-methylenebis(4-(1,1,3,3-tetramethylbutyl)-6-((2H-benzotriazole-2-yl)phenol) [produced by Asahi Denka Co., Ltd. under the trade name: ADEKASUTABU LA31]

(E): a mixture of dodecyl ester and tetradecyl ester of 2,2,4,4-tetramethyl-21-oxo-7-oxa-3,20-diazadispyro [5.1.11.2]-heneicosane-20-propanoic acid [a mixture of a compound of the formula (2) where Y is a dodecyloxycarbonylethyl group and a compound of the formula (2) where Y is tetradecyloxycarbonylethyl group; produced by Clariant Co., Ltd. under the trade name: Hostavin N24]

(F): bis(2,2,6,6-tetramethyl-4-piperidyl) sebacate [produced by Chiba-Geigy Co., Ltd. under the trade name: CHINUBIN 770]

The configuration of an extruder apparatus used in forming sheets is as follows.

Extruder: screw diameter=40 mm, single screw, vented (manufactured by Tanabe Plastics Machinery Co., Ltd.)

Die: T die, lip width=250 mm, lip gap=6 mm

Roll: three polishing rolls, vertical type

The values of the following optical properties were calculated from the results of measurements of a light transmittance at a wavelength ranging from 300 to 800 nm at every 5 nm through a 30 cm-long optical path.

Average light transmittance in the wavelength range of 380 to 780 nm x value calculated from the CIE-XYZ color specification system [x=X/(X+Y+Z)]

y value calculated from the CIE-XYZ color specification system [y=Y/(X+Y+Z)]

Examples 1 to 5 and Comparative Examples 1 to 4

A methyl methacrylate resin (a copolymer of methyl methacrylate and methyl acrylate, having a weight ratio of 96/4 and a refractive index of 1.49) in an amount of 100 parts by weight, and a compound, the type and the amount (part(s) by weight) of which are shown in Table 1, were mixed together in a polyethylene bag, and then the resulting mixture was melt-kneaded using the extruder apparatus at an extrusion resin temperature of 250° C., to form a sheet having a thickness of 3.5 mm and a width of 22 cm. The sheet thus obtained was cut to a size of a width of 7 cm and a length of 30 cm and mirror-polished at edge faces, to give a test piece (7 cm(W)×30 cm(L)×3.5 mm(T)).

The values of the optical properties of each test piece are shown in Table 1.

Further, the test pieces of Example 4 and Comparative Example 1 were tested as to their durability for respective periods shown in Table 2 using ATLAS-UVCON (manufactured by Toyo Seiki Seisaku-sho, Ltd.) at 60° C. under the cyclic irradiation condition of 4 hours UV irradiation and 4 hours pure water mist spraying.

The values of the optical properties of each test piece having undergone the test are shown in Table 2.

TABLE 1

| | Compound (type:part(s) by weight) | Light transmittance at 400 nm | Average light transmittance in 380~780 nm | x value | y value |
|---|---|---|---|---|---|
| Example 1 | (A):0.0010 | 80% | 84% | 0.313 | 0.319 |
| Example 2 | (A):0.0030 | 81% | 85% | 0.312 | 0.319 |
| Example 3 | (A):0.0070 | 81% | 85% | 0.312 | 0.319 |
| Example 4 | (A):0.0100 | 80% | 84% | 0.313 | 0.319 |
| Example 5 | (A):0.0150 | 75% | 80% | 0.314 | 0.321 |
| Comparative example 1 | — | 81% | 84% | 0.313 | 0.319 |
| Comparative example 2 | (B):0.0100 | 39% | 78% | 0.314 | 0.321 |
| Comparative example 3 | (C):0.0100 | 36% | 78% | 0.315 | 0.323 |
| Comparative example 4 | (D):0.0100 | 3% | 76% | 0.314 | 0.323 |

TABLE 2

| | Test period | Light transmittance at 400 nm | Average light transmittance in 380~780 nm | x value | y value |
|---|---|---|---|---|---|
| Example 4 | 42 days | 78% | 82% | 0.312 | 0.320 |
| Comparative example 1 | 10 days | 26% | 76% | 0.336 | 0.367 |

Examples 6 to 9 and Comparative Examples 5 and 6

A methyl methacrylate resin (a copolymer of methyl methacrylate and methyl acrylate, having a weight ratio of 96/4 and a refractive index of 1.49) in an amount of 100 parts by weight, and a compound, the type and the amount (part(s) by weight) of which are shown in Table 3, were mixed together in a polyethylene bag, and then the resulting mixture was melt-kneaded using the extruder apparatus at an extrusion resin temperature of 260° C., to form a sheet having a thickness of 3.5 mm and a width of 22 cm. The sheet thus obtained was cut to a size of a width of 7 cm and a length of 30 cm and mirror-polished at edge faces, to give a test piece.

The values of the optical properties of each test piece are shown in Table 3.

Further, these test pieces thus obtained were tested as to their durability for the period shown in Table 4 using ATLAS-UVCON (manufactured by Toyo Seiki Seisaku-sho, Ltd.) at 60° C. under the continuous UV irradiation condition instead of the cyclic UV irradiation performed in Example 4 and Comparative Example 1.

The values of the optical properties of each test piece having undergone the test are shown in Table 4.

TABLE 3

| | Compound (type: part(s) by weight) | Light transmittance at 400 nm | Average light transmittance in 380~780 nm | x value | y value |
|---|---|---|---|---|---|
| Example 6 | (A): 0.0080 | 79% | 83% | 0.313 | 0.320 |
| Example 7 | (A): 0.0150 | 79% | 83% | 0.313 | 0.320 |
| Example 8 | (A): 0.0080 (E): 0.0060 | 78% | 82% | 0.313 | 0.320 |
| Example 9 | (A): 0.0150 (E): 0.0060 | 79% | 83% | 0.313 | 0.320 |
| Comparative example 5 | — | 78% | 82% | 0.313 | 0.320 |
| Comparative example 6 | (E): 0.0060 | 78% | 83% | 0.313 | 0.320 |

TABLE 4

| | Test period | Light transmittance at 400 nm | Average light transmittance in 380–780 | x value | y value |
|---|---|---|---|---|---|
| Example 6 | 6 days | 5% | 59% | 0.383 | 0.413 |
| Example 7 | 6 days | 46% | 78% | 0.324 | 0.340 |
| Example 8 | 6 days | 36% | 74% | 0.332 | 0.350 |
| Example 9 | 6 days | 61% | 81% | 0.318 | 0.330 |
| Comparative example 5 | 6 days | 0% | 43% | 0.453 | 0.455 |
| Comparative example 6 | 6 days | 6% | 35% | 0.492 | 0.464 |

Examples 10 to 15 and Comparative Examples 7 to 10

A methyl methacrylate resin (a copolymer of methyl methacrylate and styrene, having a weight ratio of 77/23 and a refractive index of 1.53) in an amount of 100 parts by weight, and a compound, the type and the amount (part(s) by weight) of which are shown in Table 5, were mixed together in a polyethylene bag, and then the resulting mixture was melt-kneaded using the extruder apparatus at an extrusion resin temperature of 260° C., to form a sheet having a thickness of 3.5 mm and a width of 22 cm. The sheet thus obtained was cut to a size of a width of 7 cm and a length of 30 cm and mirror-polished at edge faces, to give a test piece.

The values of the optical properties of each test piece are shown in Table 5.

Further, these test pieces thus obtained were tested as to their durability for the period shown in Table 6 using ATLAS-UVCON (manufactured by Toyo Seiki Seisaku-sho, Ltd.) at 60° C. under the condition of continuous UV irradiation.

The values of the optical properties of each test piece having undergone the test are shown in Table 6.

TABLE 5

| | Compound (type: part(s) by weight) | Light transmittance at 400 nm | Average light transmittance in 380–780 nm | x value | y value |
|---|---|---|---|---|---|
| Example 10 | (A): 0.0160 | 78% | 87% | 0.313 | 0.322 |
| Example 11 | (A): 0.0300 | 73% | 84% | 0.314 | 0.322 |
| Example 12 | (A): 0.0160 (E): 0.0060 | 78% | 87% | 0.313 | 0.322 |
| Example 13 | (A): 0.0300 (E): 0.0060 | 76% | 86% | 0.313 | 0.322 |
| Example 14 | (A): 0.0160 (E): 0.0120 | 74% | 84% | 0.314 | 0.322 |
| Example 15 | (A): 0.0300 (E): 0.0120 | 76% | 84% | 0.315 | 0.323 |
| Comparative example 7 | — | 78% | 87% | 0.314 | 0.322 |
| Comparative example 8 | (E): 0.0120 | 77% | 86% | 0.314 | 0.323 |
| Comparative example 9 | (F): 0.0120 | 75% | 85% | 0.314 | 0.322 |
| Comparative example 10 | (B): 0.0300 (E): 0.0120 | 20% | 81% | 0.317 | 0.327 |

TABLE 6

| | Test period | Light transmittance at 400 nm | Average light transmittance in 380–780 nm | x value | y value |
|---|---|---|---|---|---|
| Example 10 | 6 days | 9% | 63% | 0.398 | 0.426 |
| Example 11 | 6 days | 21% | 68% | 0.367 | 0.393 |
| Example 12 | 6 days | 18% | 68% | 0.371 | 0.398 |
| Example 13 | 6 days | 45% | 77% | 0.336 | 0.353 |
| Example 14 | 6 days | 21% | 69% | 0.370 | 0.395 |
| Example 15 | 6 days | 7% | 71% | 0.355 | 0.380 |
| Comparative example 7 | 6 days | 0% | 58% | 0.428 | 0.455 |
| Comparative example 8 | 6 days | 0% | 54% | 0.422 | 0.449 |
| Comparative example 9 | 6 days | 0% | 49% | 0.453 | 0.467 |
| Comparative example 10 | 6 days | 7% | 69% | 0.366 | 0.386 |

As described above, the present invention provides a methyl methacrylate resin composition exhibiting superior transparency and durability and also provides a useful molded article having these properties, for example, an optical article such as a light guide.

What is claimed is:

1. A methyl methacrylate resin composition comprising a methyl methacrylate resin and a 2-(1-arylalkylidene) malonic acid ester in an amount of about 0.0005 to about 0.1 parts by weight per 100 parts by weight of the methyl methacrylate resin.

2. The methyl methacrylate resin composition according to claim 1, wherein the 2-(1-arylalkylidene)malonic acid ester is a compound represented by the formula (1);

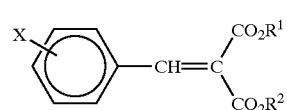

(1)

wherein X represents a hydrogen atom, an alkyl group having 1 to about 6 carbon atoms or an alkoxy group having 1 to about 6 carbon atoms, and $R^1$ and $R^2$ independently represent an alkyl group having 1 to about 6 carbon atoms.

3. The methyl methacrylate resin composition according to claim 1 or 2, wherein the 2-(1-arylalkylidene)malonic acid ester is 2-(paramethoxybenzylidene)dimethylmalonate.

4. The methyl methacrylate resin composition according to claim 1, wherein the methyl methacrylate resin composition further comprises a hindered amine.

5. The methyl methacrylate resin composition according to claim 4, wherein the hinderedlamine is a mixture of dodecyl ester and tetradecyl ester of 2,2,4,4-tetramethyl-21-oxo-7-oxa-3,20-diazadispyro[5.1.11.2]-heneicosane-20-propanoic acid.

6. The methyl methacrylate resin composition according to claim 4, wherein the hindered amine is bis(2,2,6,6-tetramethyl-4-piperidyl)sebacate.

7. The methyl methacrylate resin composition according to claim 4, wherein an amount of the hindered amine is not less than about 0.0001 parts by weight and not more than about 0.1 parts by weight per 100 parts by weight of the methyl methacrylate resin.

8. A molded article made from a methyl methacrylate resin composition comprising a methyl methacrylate resin and a 2-(1-arylalkylidene)malonic acid ester in an amount of 0.0005 to 0.1 parts by weight per 100 parts by weight of the methyl methacrylate resin.

9. The molded article according to claim 8, wherein the methyl methacrylate resin composition further comprises a hindered amine.

10. The molded article according to claim 8, wherein a light transmittance of the molded article is not less than 50% with respect to light having a wavelength of 400 nm through a 30 cm-long optical path of the molded article.

11. The molded article according to claim 8, wherein the molded article is a light guide.

* * * * *